Figure 1:
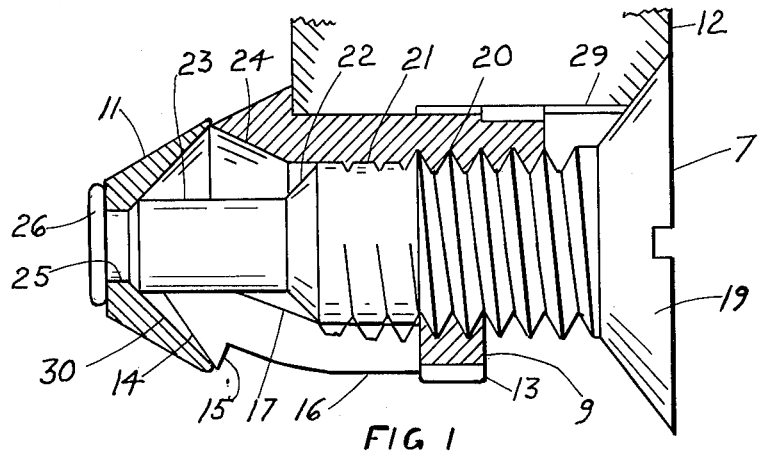

March 27, 1962

C. T. TORRESEN 3,026,761

RETRACTABLE BLIND BOLT HAVING RADIALLY CONTRACTABLE
AND EXPANDABLE WORK ENGAGING MEANS
Filed June 4, 1959

INVENTOR.
Carel T. Torresen

United States Patent Office 3,026,761
Patented Mar. 27, 1962

3,026,761
RETRACTABLE BLIND BOLT HAVING RADIALLY CONTRACTABLE AND EXPANDABLE WORK ENGAGING MEANS
Carel T. Torresen, 469 22nd St., Santa Monica, Calif.
Filed June 4, 1959, Ser. No. 818,065
1 Claim. (Cl. 85—2.4)

This invention relates to a blind bolt. That is, to one of that group of threaded fasteners that may be inserted thru an aperture in the work to be joined, from the operator side and then tightened from the operator bolt head side to secure the parts to be joined, by expansion of the bolt entering end assembly at the far or blind side.

This invention is an improvement in a blind bolt, in that unlike the permanent installation of the usual blind bolt, the inventor's bolt is removable after installation without destruction to itself or to its surroundings, an advantage in the construction and disassembly of many manufactured items, such as close in doors of aircraft and the like.

The customary blind bolt may consist of a nut or washer cupped to be drawn up and expanded over a sleeve on the blind side of the work, actuated by pulling a pin thru the sleeve.

In another type of blind bolt comprising a split nut and a screw, the split end of the nut is caused to expand by the wedging effect of the screw end as it advances into the nut.

There are many other styles of blind bolts, yet it is believed the two mentioned are sufficiently illustrative for purposes of comparison. In either of the two examples cited, part of the bolt assembly, or more often the entire bolt, must be destroyed, as by drilling, for removal.

This invention incorporates the principle of the expansible split nut, preferably of a flexible metal and a wedging screw, generally of metal and also incorporates a retraction mechanism, whereby after the nut split end is expanded by the advancing screw, it may be closed again by screw retraction, enabling the bolt assembly to be removed intact and also importantly, without damage to the walls of the enclosure.

The complete operation may be repeated a number of times or until the bolt assembly is no longer usable.

Further explanation of the invention may be had by reference to the drawing. All projected views are drawn in the third angle projection.

FIG. 1 shows the retractable bolt in side elevation in section, the upper half of which is assembled in work of a suitable thickness, the spline nut withdrawn rearwardly and the shouldered end expanded and abutting the forward face of the work. The lower half of the bolt, also in section, illustrates the normal configuration of the nut prior to expansion.

Figure 2:
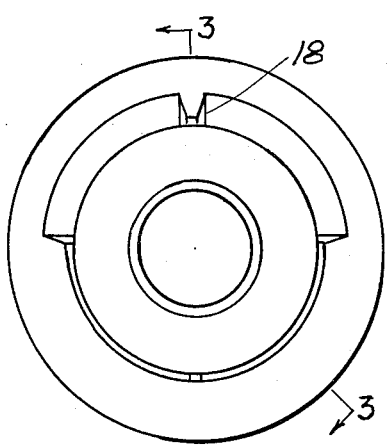
Figure 3:
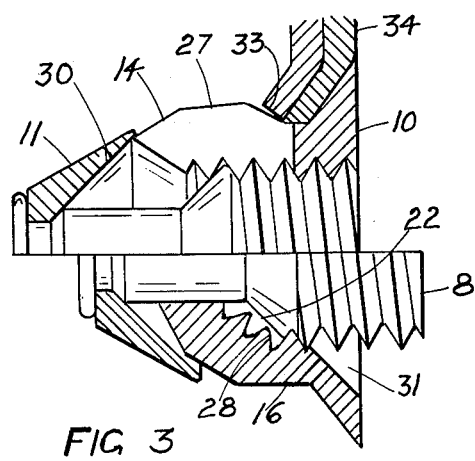

FIG. 2, an end view of the modification of the bolt shown in FIG. 3. The upper half of the nut expanded. The lower half of the nut end is shown retracted to closed position.

FIG. 3, in side elevation in section, a modification of the bolt, primarily a design of a stub type. The upper half view illustrates the screw advanced and the nut end expanded. The lower half view shows the screw and split nut end retracted.

Figure 4:

FIG. 4, an elevation, partly in section of the retraction member.

Figure 5:
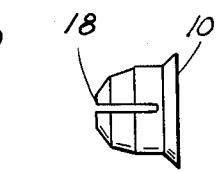

FIG. 5, in elevation, a full side view of the nut of FIG. 3.

Figure 6:

FIG. 6, a rear end view of the nut, FIG. 5.

Figure 7:
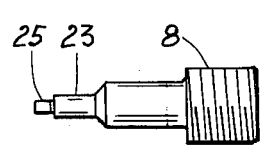

FIG. 7, in side elevation, a view of the screw of FIG. 3.

Figure 8:

FIG. 8, a rear end view of the screw in FIG. 7.

The sectioned view FIGURE 3, is drawn as it would appear along the direction lines 3—3 in FIGURE 2.

The nuts 9 and 10 can be manufactured preformed to either the closed, or retracted condition, or in the expanded condition and subsequently closed to fit the expanding screw. It has been found in practise however, that nut 9 is more readily manufactured in the closed condition due to the ease of usage dimensional control.

Nut 10, however, because of the thread necessarily deformed when in the closed condition is better manufactured first in the expanded condition and then the split end closed in, in preparation of needful expansion usage.

All of the parts of the bolt assembly, member 11, screws 7 and 8, and nuts 9 and 10 lend themselves to manufacture by the conventional methods employed for nuts and screws.

The nut 9 of FIG. 1 comprises a splined head 13, a shank end containing cam face 14, a shoulder 15, a shank outer diameter 16, a bore threaded from head end and terminating in a taper bore 17. The nut work entering end is split lengthwise for portion of its length as shown in FIG. 1 and similar to that of 18 in FIG. 5. FIG. 2 indicates a plurality of splits.

The screw 7 of FIG. 1 contains a typical flush head 19, and having driving media such as a slot or recess. The style of screw head shown, is incidental, since other styles, such as the protruding types may also be utilized. The screw thread 20 is of a length such as to engage the nut the minimum amount necessary to overcome the initial nut retracting load and when fully retracted to shoulder 15 tightness with work 12 provide an axial clearance between nut head and the screw head.

The blank shank portion 21 of screw 7 is of as large a diameter as to merely slip thru the tap drill diameter of the nut, in order to retain as much gain as possible in expansive effort when the chamfer 22 engages slope 17, of the nut. At all times closed or fully expanded, the nut sliding end may be constrained within the confines of the member 11 cupped inner face.

The nut and screw as a unitary device is provided by sliding secondary shank 23 thru nut clearance hole 24, into nut until chamfer 22 engages nut slope 17. Member 11 is then installed on screw shank extension 25 and extension riveted over member 11 as at 26.

The nut assembly FIG. 3 illustrates a configuration differing from FIG. 1 in that the nut 10 is shown a countersink head type and the screw 8 of the internal wrenching headless type. Tho conceivably the nut could be lengthy, the nut shown is extremely short, therefore the nut bore threads 28 after straight tapping and subsequent deformation caused by the closing operation about the screw shank, constitute a pressure area against which the chamfer 22 may exert pressure to expand the shank end of the nut. The other elements of nut assembly FIG. 3 are substantially identical of that of FIG. 1, except that a compound surface has been included on the exterior of the nut shank in which surface 27 has been added to facilitate closure of the nut after installation.

In FIG. 6 may be noted a number of screw driver slots 31.

In FIG. 7 the screw 8 shank extension 25 is shown as it would appear before being upset over the member 11. The end view 8 incorporates the conventional hexagon drive socket 32.

Assembly of the unitary blind bolt as shown on the lower half of FIG. 1 into a hole in work 12 to be joined, is accomplished by entering pilot member 11 into the hole and of then sliding nut shank 16 into the hole until the protruding splines of head 13 engage the surface of the countersink hole. Pressure exerted on the screw 7 will then force the splined head 13 to form internal torsion resisting grooves 29 in the wall of the hole in work 12, to an axial depth determined by the initial position of the nut on the screw and engagement of the screw head 19 with the surface of the countersink hole, the work 12 being relatively softer than the head 13 splines.

The head 13 splines are preferably rounded on the tops and smoothed to reduce the notch sensitivity of the surrounding wall of hole in work 12. The entering faces of the spline teeth may be provided with work shearing edges to minimize work band tension thru work removal, rather than introduce band tension thru compressive forces applied during the bolt installation, having the effect of work expansion.

Once installed to depth and head 19 engaging countersink surface, a driving force, as with a screw driver applied in the proper direction to the recess in the screw head, will retract the nut 9 toward the screw head, the screw chamfer 22 in the meanwhile engaging the nut surface 17 and thereby causing the nut end and shoulder 15 to move radially outwardly until the screw diameter 21 can no longer have expansion effect on the nut surface 17. A continuation of the screw driver force on the screw will eventually bring the nut rearward until the shoulder 15 comes to rest on the inner surface of work 12.

Disengagement of the unitary device as shown in the upper half of FIG. 1 is accomplished by reversing the assembly force on the screw driver. The screw 7 will tend to back out of the hole in 12. However in doing so, the member 11 attached to screw shank 25 by upset head 26 will bring under surface 30 to bear on nut surface 14. Both surfaces 14 and 30 have compatible wedging angles, therefore the axial driving force of member 11 will cause the slotted nut end to close in radially until the inner clearance surface 24 contacts screw shank 23.

Since the nut, torsionally restrained yet free to slide axially by the splined head 13 and the splines 29, initially had retreated toward the screw head upon expansion, the nut threads have been displaced axially toward the screw head also. Therefore during the retraction and nut closing process the screw head had receded from the countersink surface of work 12, a distance defined by the closing operation. This distance is sufficient to enable a conventional screw head grasping tool such as pliers, to withdraw the unitary bolt from the hole in the work.

Assembly of the unitary blind bolt as shown in the lower half of FIG. 3 is accomplished readily by merely inserting the device into a prepared hole in the work 34 and by holding nut 10 against rotation thru application of a conventional holding tool in slots 31 and of also applying twisting forces to a conventional driver tool employed in recess 32, the screw 8 advances into the nut, chamfer 22 of the screw engages the deformed and displaced nut thread surfaces 28 forcing nut surface 16 to bend outward about restraining wall 33 of the hole in the work. The expansion is permitted by the employment of nut slots 18 FIG. 5 and as shown spaced about in FIG. 2.

During expansion, nut threads 28 are restored approximately to original diameter, yet may because of residual distortion provide sufficient self locking retentivity of screw 8 when in advanced position.

Work 34 is representative of thin sheet material dimpled to contain the screw head. This blind bolt is not however limited to the countersink head, since other type heads may be used, such as the protruding head types.

Withdrawal of the blind bolt assembly shown in the upper half of FIG. 3 is effected by holding the nut against rotation by application of a holding tool to slots 31 and of then unscrewing screw 8 by force applied to a tool in recess 32, until the inner surface 30 of member 11 has forced surfaces 14 and 27 of the nut split end to contract and to come to rest on the screw shank, as in the manner of the blind bolt combination of FIG. 1. Withdrawal of the contracted blind bolt from the work perforation may not require the use of tools, however, should this be necessary, the exposed threads of screw 8 provide sufficient provision for application of a withdrawal tool.

Holding the nut of FIG. 3 and torqueing the screw has been stated, contrariwise it is evident that the screw could be held against rotation and the nut torqued.

Further modification of the retractable blind bolt may be perceived by those skilled in the art of blind bolt usage. It is believed that the elements described above have clearly set forth an improvement in the art of blind bolts, namely a retractable blind bolt.

Therefore, having described my invention, I claim:

A retractable blind fastener including a nut, a screw partly threaded within the nut and a contraction element; said nut being a flexible relatively thin walled tubular body having a laterally extending head at one end, said nut having an internally threaded bore extending from said head end for at least a portion of its length, the bore portion at a second nut end remote from said head defining a generally conical wall diametrically decreasing and terminating at a cylindrical orifice, said nut having a laterally extending external shoulder at said second end, said shoulder lying within the external circumference of said nut body, the external nut surface at said second end inclining from said orifice to said shoulder to provide a cam surface, said nut being formed with a plurality of longitudinally extending, circumferentially spaced slits extending from near said first end and through said second end; said screw having a first end, a threaded shank extending from said first screw end, a conical shoulder juxtaposed to said nut conical wall, and a reduced diameter portion extending from the small diameter end of said conical shoulder and through said nut orifice; said contraction element defining a cupped member, said cupped member being secured to said reduced diameter screw portion, the major diameter of said cupped member being less than the external diameter of said tubular nut body, the inner surface of said cupped member being generally conical and being in engagement with said inclined external nut surface adjacent said external nut shoulder, whereby rotation of said screw in a tightening direction will move said screw conical shoulder against said nut conical wall and said cupped member axially of said nut second end to move said nut external shoulder into workpiece engaging position and rotation of said screw in the opposite direction will move said cupped member into engagement with said nut second end to contract said second end and release said nut external shoulder from engaging position.

References Cited in the file of this patent
UNITED STATES PATENTS

| | | |
|---|---|---|
| 1,086,568 | Stirckler | Feb. 10, 1914 |
| 2,701,398 | Bohmer | Feb. 8, 1955 |

FOREIGN PATENTS

| | | |
|---|---|---|
| 75,518 | Norway | Aug. 22, 1949 |
| 502,703 | Canada | May 18, 1954 |